US007116088B2

(12) United States Patent
Tran et al.

(10) Patent No.: US 7,116,088 B2

(45) Date of Patent: Oct. 3, 2006

(54) HIGH VOLTAGE SHUNT REGULATOR FOR FLASH MEMORY

(75) Inventors: Hieu Van Tran, San Jose, CA (US); Thuan T. Vu, San Jose, CA (US); Susmita Karmakar, Malvern, PA (US)

(73) Assignee: Silicon Storage Technology, Inc., Sunnyvale, CA (US)

( * ) Notice: Subject to any disclaimer, the term of this patent is extended or adjusted under 35 U.S.C. 154(b) by 647 days.

(21) Appl. No.: 10/457,975

(22) Filed: Jun. 9, 2003

(65) Prior Publication Data

US 2004/0245975 A1 Dec. 9, 2004

(51) Int. Cl.
*G05F 1/40* (2006.01)
*H02M 3/18* (2006.01)

(52) U.S. Cl. .................................................... 323/282

(58) Field of Classification Search ................ 323/268, 323/271, 282, 312–317; 363/59, 60; 327/530, 327/534–539, 542, 543

See application file for complete search history.

(56) References Cited

U.S. PATENT DOCUMENTS 4,593,208 A 6/1986 Single
4,908,566 A * 3/1990 Tesch ......................... 323/280
5,122,730 A * 6/1992 Milberger et al. .......... 323/370
5,886,487 A * 3/1999 Khayat et al. ............. 318/254
6,150,872 A 11/2000 McNeill et al.
6,282,145 B1 8/2001 Tran et al.
6,603,350 B1 * 8/2003 Lagoguez et al. .......... 330/129
6,683,441 B1 * 1/2004 Schiff et al. ................ 323/222
6,690,147 B1 * 2/2004 Bonto ......................... 323/280

* cited by examiner

*Primary Examiner*—Matthew V. Nguyen

(74) *Attorney, Agent, or Firm*—DLA Piper Rudnick; Gray Cary US LLP

(57) ABSTRACT

A high shunt regulator provides precise voltage over process, temperature, power supply, and foundries. The HV level is settable by a digital control bits such as fuse bits. A filter network filters out the ripple noise and charge transient. A tracking capacitor divider network speeds up response time. A fractional band gap reference provides fractional bandgap voltage and current, and operates at low power supply and has superior power supply rejection. It is unsusceptible to substrate hot carrier effect. It exposes very little to drain induced barrier lowering effect. The bandgap core has better than conventional transient response and stability. One embodiment has adjustable level control. Complementary TC (temperature coefficient) trimming allows efficient realization of zero temperature coefficients of current and voltage. Higher order curvature correction of voltage and current is integrated. Replica bias for the control loop is presented. A Binary and Approximation Complementary TC search trimming is described. A zero TC fractional voltage less than the theoretical bandgap voltage (<<~1.2 Volt) is realizable. The bandgap core has a filtering mechanism to reject high frequency noise. A low power startup circuit powers up the bandgap. The bandgap also has variable impedance.

8 Claims, 11 Drawing Sheets

HIGH VOLTAGE SHUNT REGULATOR FOR FLASH MEMORY

CROSS-REFERENCE TO RELATED APPLICATIONS

This application is related to U.S. patent application Ser. No. 10/458,006, filed on even date herewith, entitled "Curved Fractional CMOS Bandgap Reference", inventor Hieu Van Tran, the disclosure of which is incorporated herein by reference.

BACKGROUND

The invention relates to high voltage regulators, and more particularly high voltage regulators including a shunt regulator and/or a bandgap reference generator.

A conventional mixed mode integrated circuit system frequently uses different voltage supplies. Analog signal processing, such as amplification, comparison, and pulse generation, may be performed at high voltage. A FLASH memory applies an erase signal and a program signal to memory cells. The erase signal and the program signal have voltage levels greater than a supply voltage. Also in multi-level volatile memories, the variation of the voltage level of the program signal falls in a smaller range for the multibit signals stored in the memory cells.

A high voltage supply is typically used on-chip for non-volatile programming, erasing, and read operations. High voltage is generated typically from a charge pump utilizing capacitors. Regulation of the charge pumped high voltage provides precise voltage level for chip operation. The regulation is typically done using Zener-based techniques.

SUMMARY

In one aspect, the present invention uses a bandgap including a mixed op amp operated in a continuous mode to provide precise voltage over process, temperature, power supply, and foundries. A HV level is provided at different level for different chip operations and is settable by digital control bits, such as fuse bits at power up and/or at initialization of chip operations. A filter network filters out the ripple noise and charge transient. A mixed scheme helps to achieve the regulation, and may have both low voltage and high voltage devices as part of a circuit block to minimize area. The bandgap may also include certain elements to achieve more than one circuit function. A simulated resistor using HV PMOS in a certain configuration to achieve a precision divider ratio. A tracking capacitor divider tracks the simulated resistor ratio to speed up the response time.

A bandgap architecture is desirable to provide fractional bandgap voltage (<1.2 V) and current that is suitable for nano-meter process technology. As technology progresses into the nano-meter regime, transistor performance is susceptible to secondary effect such as channel length modulation (CLM), breakdown (BV), gate or drain induced lowering (GIBL or DIBL), direct tunneling. Hence a circuit architecture that mitigates these effects is desirable. In addition, for nano-meter technology, power supply level is reduced significantly, hence fractional level is desired.

In another aspect, the present invention provides fractional bandgap voltage and current at the same time. It works at low power supply and has superior power supply rejection. It is not susceptible to substrate hot carrier effect. It has very little exposure to drain induced barrier lowering effect. The bandgap core has better than conventional transient response and stability. One embodiment has adjustable level loop control. Complementary TC (temperature coefficient) trimming allows efficient realization of zero temperature coefficients of current and voltage. Higher order curvature correction of voltage and current is integrated. Replica bias for the control loop is presented. Binary and Approximation Complementary TC search trimming is described. A zero TC fractional voltage less than the theoretical bandgap voltage (<<~1.2 Volt) is realizable. The bandgap core has a filtering mechanism to reject high frequency noise. The invention includes low power startup circuits to power up the bandgap. The bandgap also has variable impedance.

DETAILED DESCRIPTION

As used herein, a N-type NMOS enhancement transistor is an enhancement transistor having a gate threshold, for example in the range of approximately 0.3 to 1.0 volts. A P-type transistor is a PMOS enhancement transistor having a gate threshold approximately in the range of −0.3 to −1.0 volts. A NZ NMOS transistor is a native low voltage transistor having a gate threshold approximately in the range of −0.1 to 0.3 volts. An NH NMOS transistor is an enhancement high voltage transistor having a gate threshold approximately in the range of 0.3 to 1.0 volts. A PH PMOS transistor is an enhancement high voltage transistor having a gate threshold of approximately in the range −0.3 to −1.0 volts. An NX NMOS transistor is a native high voltage transistor having a gate threshold voltage approximately in the range −0.1 to 0.3 volts.

As used herein, the symbol $VBE_x$ is the voltage across the base-emitter of a transistor x, and a resistance $R_y$ is the resistance of a resistor y.

Figure 1:
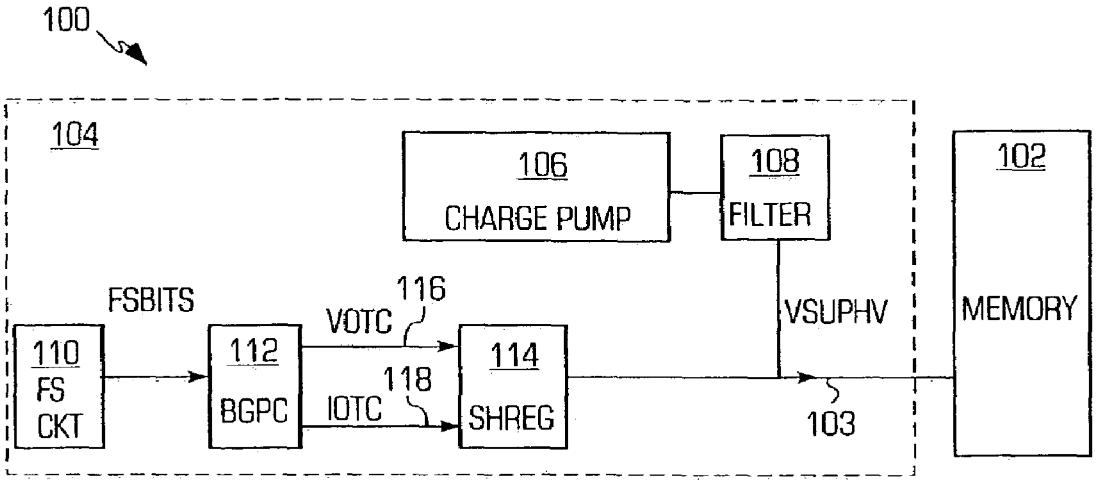
FIG. 1 is a block diagram illustrating a non-volatile multilevel memory system.

FIG. 1 is a block diagram illustrating a non-volatile multilevel memory system 100 according to the present invention.

The non-volatile multilevel memory system 100 comprises a memory array 102 and a high voltage power generator 104. The high voltage power generator 104 generates a regulated high voltage supply signal (VSUPHV) 103. For clarity and simplicity, only one regulated high voltage supply signal 103 is shown and described herein. However, voltage signals having different voltage levels may be generated as appropriate for programming, reading, erasing, and verifying the memory array 102. The non-volatile multilevel memory system 100 also comprises control logic (not shown).

The memory array 102 comprises a plurality of memory cells (not shown), a plurality of sense amplifiers (not shown), a plurality of decoders (not shown). The memory cells may include data cells and reference cells. The memory cell may store multilevel digital data. In one embodiment, the memory cells are arranged in 16K rows by 8K columns. In one embodiment, the memory array includes a source side injection flash technology, which uses lower power in hot electron programming and efficient injector based Fowler-Nordheim tunneling erasure. The programming is done by applying a high voltage on the source of the memory cell, a bias voltage on the control gate of the memory cell, and a bias current on the drain of the memory cell. The erase is done by applying a high voltage on the control gate of the memory cell and a low voltage on the source and/or drain of the memory cell. The verify (sensing or reading) is done by placing the memory cell in a voltage mode sensing, e.g., a bias voltage on the source, a bias voltage on the gate, a bias current (or zero current) on the drain, and the voltage on the drain is the readout voltage. In another embodiment, the verify (sensing or reading) is done by placing the memory cell in a current mode sensing, e.g., a low voltage on the source, a bias voltage on the gate, a load (resistive or transistors) coupled to the drain, and the voltage on the load is the readout voltage. In one embodiment, the array architecture is the one disclosed in U.S. Pat. No. 6,282,145, entitled "Array Architecture and Operating Methods for Digital Multilevel Nonvolatile Memory Integrated Circuit System" by Tran et al., the subject matter of which is incorporated herein by reference.

The high voltage power generator 104 comprises a charge pump 106, a filter 108, a fuse circuit 110, a bandgap generator 112, and a high voltage shunt regulator 114.

In a normal operation mode, the charge pump 106 is enabled to convert a voltage from a power supply (VSUP) to a high voltage suitable for non-volatile memory operation, such as program, erase, and read operation. In one embodiment, the charge pump 106 may be the charge pump disclosed in pending U.S. patent application Ser. No. 10/044,273, entitled "High voltage generation and regulation system for digital multilevel nonvolatile memory", filed Jan. 10, 2002, the subject matter of which is incorporated herein by reference. The output of the charge pump 106 may be regulated to a precise voltage that functions as a high voltage supply source, and may be wave-shaped and applied to the decoders (not shown) and subsequently to the memory cells (not shown) in the memory array 102.

The filter 108 filters out ripple of high frequency noise from the operation of the charge pump 106 to form a high voltage supply signal and also may function as a charge reservoir for transient program, read, or erase operation In one embodiment, the filter 108 is a resistor-capacitor filter. In another embodiment the filter 108 is a diode-capacitor filter, in which a diode substitutes for the resistor in series with a capacitor. In another embodiment, the filter 108 is a diode-resistor-capacitor filter, in which a diode is in series with the resistor in series with the capacitor. The diode may be a PN junction diode or a metal-oxide-silicon (MOS) transistor with gate and drain tied together. Another embodiment of the bandgap does not include the filter 108.

The fuse circuit 110 stores digital data that are used to set voltages and control signals. The fuse circuit 110 includes control logic (not shown) that decodes the stored digital data to set the control signals. As described below, the fuse circuit 110 sets an output high voltage level at power up or at the start of an operation, such as program, erase or read. The output high voltage level may be different for program, erase, or read.

The bandgap generator 112 provides precise voltage level signals over process, temperature, and supply as desired for multilevel programming, erasing, and sensing. The bandgap generator 112 provides a zero temperature coefficient voltage (V0TC) 116 and a zero temperature coefficient current (I0TC) 118. The zero temperature coefficient voltage (V0TC) 116 and the zero temperature coefficient current (I0TC) 118 may be trimmable based on the control signals from the fuse circuit 110. The bandgap generator 112 may be, for example, a bandgap reference generator 500 (see FIG. 5), or a bandgap reference generator 700 (see FIG. 7).

The high voltage shunt regulator 114 regulates the high voltage supply signal from the filter 108 in response to a trimmable zero temperature coefficient voltage V0TC or a trimmable zero temperature coefficient current I0TC from the bandgap generator 112.

Figure 2:
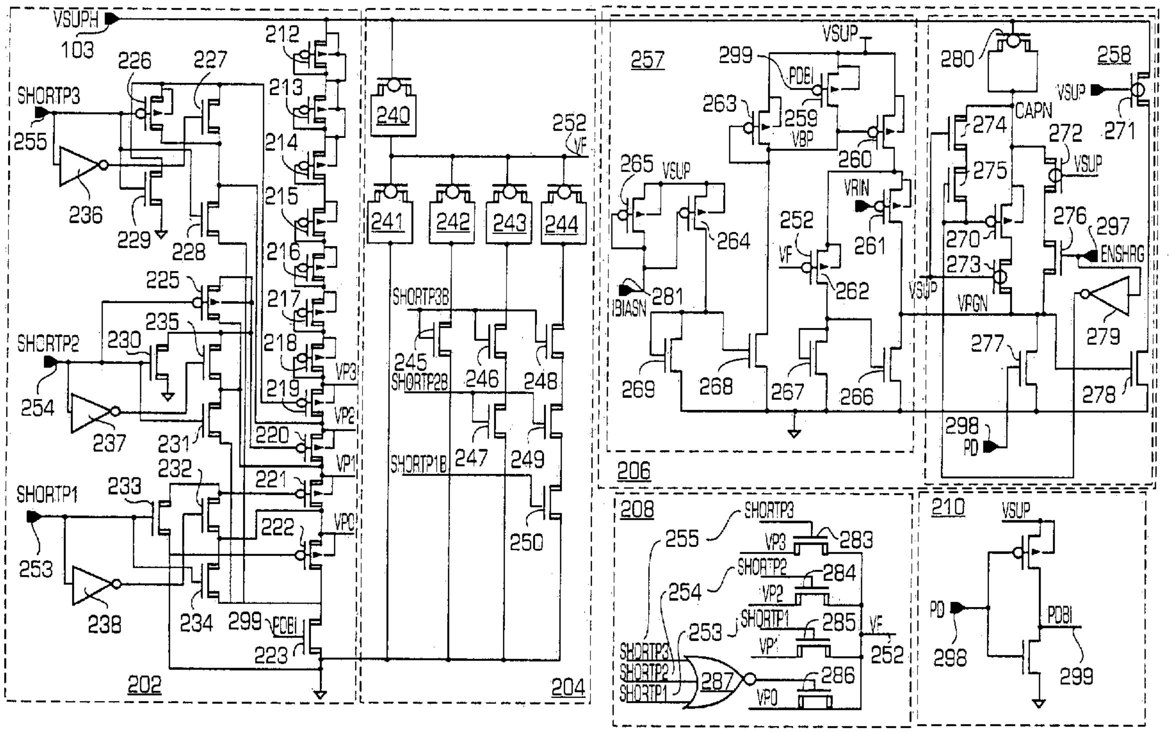
FIG. 2 is a block diagram illustrating a high voltage shunt regulator of a high voltage power generator of the non-volatile multilevel memory system of FIG. 1.

FIG. 2 is a schematic diagram illustrating the high voltage shunt regulator 114.

The high voltage shunt regulator 114 comprises a trimmable MOS voltage divider 202, a capacitor divider 204, an operational amplifier 206, a selection circuit 208, and an inverter 210.

The trimmable MOS voltage divider 202 comprises a plurality of PMOS 212 through 222 arranged with the drain-source terminals connected in series between the regulated high voltage supply signal (VSUPHV) 103 and an NH NMOS transistor 223 to form a divider chain. In one embodiment, the PMOS transistors 212 through 222 provide a divider chain that simulates a resistor chain.

The PMOS transistors 212 through 218 are diode connected to eliminate body effect. The PMOS 219 through 222 are selectively diode connected.

The drain-source terminals of the NH NMOS transistor 223 are coupled between the drain of the PMOS transistor 222 and ground for power down in response to an inverted power down (PDB1) signal 299 applied to the gate of the NH NMOS transistor 223. The NH NMOS transistor 223 is coupled on the drain-side to eliminate additional error.

The voltage divider 202 further comprises a selection circuit that includes a PMOS transistor 225 and 226, a plurality of NH NMOS transistors 227 through 234, and a plurality of inverters 236 through 238.

The selection circuit of the voltage divider 202 selectively shorts out one, two, or three of the PH PMOS transistors 220, 221, and 222, respectively, to modify the ratio. The selection circuit is arranged so that any voltage drop is at the drain side only, not at the gate so as to not introduce any errors. The selection circuit of the voltage divider 202 selectively diode connects or shorts out the PH PMOS transistors 220, 221, and 222 in response to selection signals (SHORTP1) 253, (SHORTP2) 254, and (SHORTP3) 255. The divider chain formed of the PMOS transistors 212 through 222 generate tap voltages VP3, VP2, VP1, and VP0 on the drain terminals of the PMOS transistors 218, 219, 220, and 221, respectively.

The selection circuit 208 comprises a plurality of NH NMOS transistors 283 through 286 and a NOR gate 287. The selection circuit 208 selectively couples the selected divided voltage from the voltage divider 202 to apply it to a voltage node 252. The NH NMOS transistors 283 through 286 selectively couple the tap voltage, VP3, VP2, VP1, and VP0, respectively, to the voltage node 252 in response to the selection signals (SHORTP3) 255, (SHORTP2) 254, (SHORTP1) 253, and the NOR of the selection signals 253 through 255, respectively.

The inverter 210 generates an inverted power down signal 299 in response to a power down signal 298.

The capacitor divider 204 comprises a plurality of capacitors 240 through 244, and a plurality of NH NMOS transistors 245 through 250. The capacitors 240 and 241 are coupled in series between regulated high voltage supply signal (VSUPHV) 103 and ground, and form a node 252 on which a voltage VF is connected. The capacitors 242, 243, and 244 are coupled between the node 252 and the NH NMOS transistor 245, the NH NMOS transistors 246 and 247, and the NH NMOS transistors 248 through 250, respectively, to form a selectable capacitor divider in response to inverted selection signals 253, 254, and 255, respectively. The capacitors 240 through 244 form a tracking capacitor divider to speed up the response time of the divider. The NH NMOS transistors 245 through 250 form switches to modify the capacitor ratio appropriately to track the PH PMOS transistor ratio of the voltage divider 202. In one embodiment, the capacitor 240 may be two or more capacitors coupled in series to buffer the high voltage drop across the capacitor 240.

The operational amplifier 206 comprises an amplifier stage 257 and a control stage 258.

The amplifier stage 257 comprises a plurality of PMOS transistors 259 through 265 and a plurality of NMOS transistors 266 through 269. The control stage 258 comprises a PMOS transistor 270, a plurality of NX transistors 271 through 273, a plurality of NH NMOS transistors 274 through 276, a plurality of NMOS transistors 277 and 278, an inverter 279 and a capacitor 280.

The amplifier stage 257 controls the shunt operation of the control stage 258 in response to comparing the divided voltage on the node 252 that is divided from the high voltage supply signal (VSUPHV) 103 and compared to a reference voltage, such as the zero temperature coefficient voltage (V0TC) 116. A bias current (IBIASN) 281 adjusts the biasing of the amplifier stage 257. The amplifier stage 257 includes a transconductance operational amplifier. The PMOS transistors 261 and 262 are an input pair for receiving a reference voltage, such as the zero temperature coefficient voltage (V0TC) 116, and a divided voltage on the node 252, respectively. The PMOS transistors 260, 261 and 262 and the NMOS transistors 266 and 267 are arranged as a differential amplifier. The PMOS transistors 259, 263, 264, and 265 and the NMOS transistors 268 and 269 form a bias circuit for providing a voltage VBP to bias the PMOS transistor 260 in response to a bias current (IBIASN) 281. The PMOS transistor 259 includes a drain terminal coupled to the common node of the gates of the PMOS transistors 260 and 263 to power down the amplifier stage 257 in response to the inverted power down signal (PDBI) 299.

The control stage 258 includes a shunt circuit to shunt current from the high voltage supply signal (VSUPHV) 103 as part of a control loop with the amplifier stage 257. The control stage 258 further includes the HV buffered capacitor 280 for loop stability and to control the ramp rate of the high voltage supply signal (VSUPHV) 103.

The NMOS transistor 278 is a low voltage device that functions as a shunt element to shunt away the current from the high voltage supply signal (VSUPHV) 103 to regulate the signal 103. The NX NMOS transistor 271 buffers the high voltage for the NMOS transistor 278.

The PMOS transistor 270 and the NH NMOS transistor 274 bias one terminal of the capacitor 280 at an intermediate voltage so the capacitor 280 can avoid breakdown. In another embodiment, the capacitor 280 may be two capacitors in series which quadruples the circuit area for the same capacitance.

The NX NMOS transistor 273 serves as a HV buffering for the NMOS transistors 266, 277, and 278 and also serves as a resistor in series with the capacitor 280 for loop stability.

The capacitor 280 provides loop stability and also together with the current bias from the NMOS transistor 266 control the ramp rate of the high voltage supply signal 103. This is also to avoid the overshoot if the high voltage supply signal (VSUPHV) 103 rises too fast.

The NH NMOS transistor 276, the NX NMOS transistor 272, the NH NMOS transistor 275, and the inverter 279 are used to short out the PMOS transistor 270 and the NX NMOS transistor 273 when regulating the high voltage supply signal (VSUPHV) 103 at low voltage levels or improving the loop stability. In one embodiment, the low voltage levels are in the range of 4–6 volts. The inverter 279 is enabled by an enable shunt regulator signal 297. The NX NMOS transistor 272 buffers the high voltage for the NH NMOS transistor 276. The NH NMOS transistor 275 disconnects the NH NMOS transistor 274 from shorting the supply voltage VSUP to the node CAPN by effectively acting as a reversed bias diode (with gate and drain tied together). This enabling mode may also be used to assist in stability of the loop when the high voltage supply signal (VSUPHV) 103 reaches a plateau or flat level.

In another embodiment, the amplifier stage 257 may include the HV transistors instead of low voltage transistors. In another embodiment, the amplifier stage 257 may be powered from a HV supply such as the high voltage supply signal (VSUPHV) 103 instead of the supply voltage VSUP. In this case, appropriate usage of HV devices are used to avoid breakdown. In another embodiment, the amplifier 257 receives power from a filter network such as a RC or a DRC (a diode in series with RC) network. In another embodiment, the filter is coupled from a HV supply such as the high voltage supply signal (VSUPHV) 103. In this case, the filter network serves to smooth out the ripple and noise from the HV supply signal (VSUPHV) 103 before being supplied to the amplifier 257.

Figure 8:
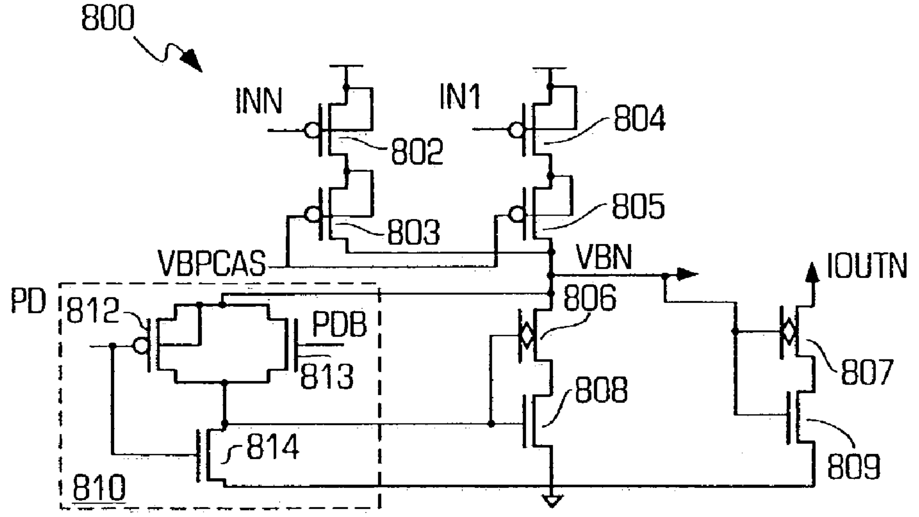
FIG. 8 is a schematic diagram illustrating a current summer.
Figure 9:
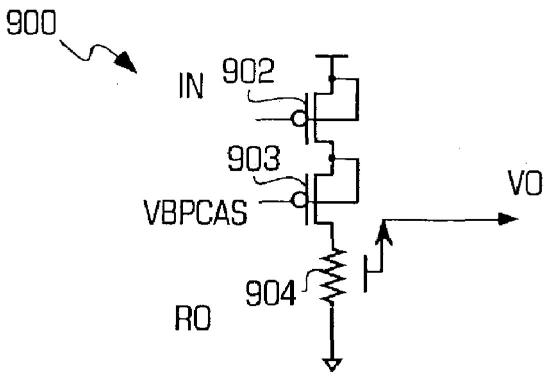
FIG. 9 is a schematic diagram illustrating a current to voltage converter.

Bandgap reference generators are next described. The bandgap generator 112 generates a zero temperature coefficient current (I0TC) 118 that may be formed from a plurality of currents that are summed together by a current summer, such as a current summer 800 (FIG. 8). The zero temperature coefficient current (I0TC) 118 may be converted into a zero temperature coefficient voltage (V0TC) 116 by a current to voltage converter, such as a current to voltage converter 900 (FIG. 9). Each of the currents that are summed to form the zero temperature coefficient current (I0TC) 118 may be generated by bandgap reference generators described below in conjunction with FIGS. 5A, 5B, 7, 10, 11, 13, and 14. First, a conventional bandgap reference is described.

Figure 3:
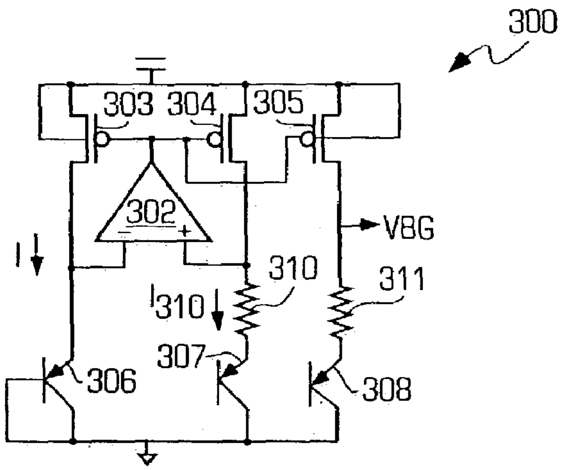
FIG. 3 (PRIOR ART)
FIG. 3 is a schematic diagram illustrating a conventional bandgap reference generator.

FIG. 3 is a schematic diagram illustrating a conventional band gap reference generator 300.

The conventional band gap reference generator 300 comprises an operational amplifier 302, a plurality of PMOS transistors 303 through 305, a plurality of pnp bipolar junction transistors 306 through 308, and a plurality of resistors 310 and 311.

The drain-source terminals of the PMOS transistor 303 and the emitter-collector junction of the PNP bipolar junction transistor 306 are coupled in series between a supply voltage and ground. The drain-source terminals of the PMOS transistor 304, the resistor 310 and the emitter-collector terminals of the transistor 307 are coupled in series between the supply voltage and ground. The operational amplifier 302 biases the gates of the PMOS transistors 303 and 304 in response to the voltages on the drains of the PMOS transistors 303 and 304 applied to the negative and positive inputs, respectively. The PMOS transistor 305, the resistor 311 and the transistor 308 are arranged in a similar manner as the respective PMOS transistor 304, the resistor 310 and the bipolar junction transistor 307 with the exception that the drain of the PMOS transistor 305 forms an output terminal that provides an output bandgap voltage VBG.

The current I into the emitter of the transistor 306 is:

$$I=dVBE_{306\text{-}307}/R_{310}=dVBE/R_{310} \quad (1)$$

The current $I_{310}$ in the resistor 310 is:

$$I_{310}=(VBE_{306}-VBE_{307})/R_{310}=dVBE/R_{310} \quad (2)$$

The output band gap voltage is $$VBG=VBE+(R_{311}/R_{310})\, dVBE \quad (3)$$

The conventional band gap reference generator 300 provides no zero temperature coefficient (TC) current, has no fractional band gap voltage, and requires a supply voltage VDD greater than 1.2 volts (VBG). Further, the conventional band gap reference generator 300 is susceptible to channel length modulation (CLM), drain induced lowering (DIBL), and near break down condition.

Figure 4:
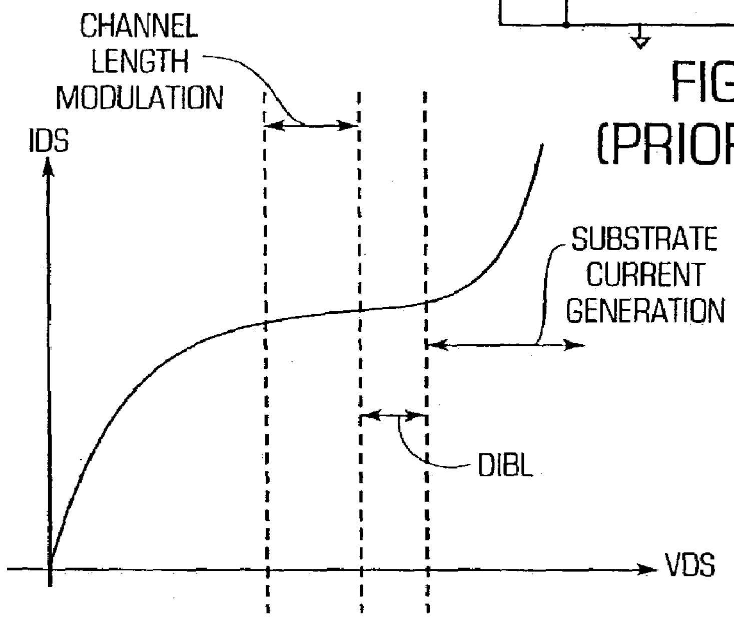
FIG. 4 is a graph illustrating the drain-source current versus drain-source voltage characteristic of a typical sub-micron metal-oxide-silicon field effect transistor (MOSFET).

FIG. 4 is a graph illustrating the drain-source current versus drain-source voltage characteristic of a typical submicron metal-oxide-silicon field effect transistor (MOSFET).

The current-voltage (I-V) characteristic is poor at medium voltage, and is especially worse at 65 nanometer and 90 nanometer process nodes. Thus, if the band gap core is maintained at low voltage, the channel length modulation (CLM), the drain induced lowering (DIBL) and the near breakdown condition do not affect the precision level.

Bandgap reference generators in accordance with the present invention are next described.

Figure 5A:
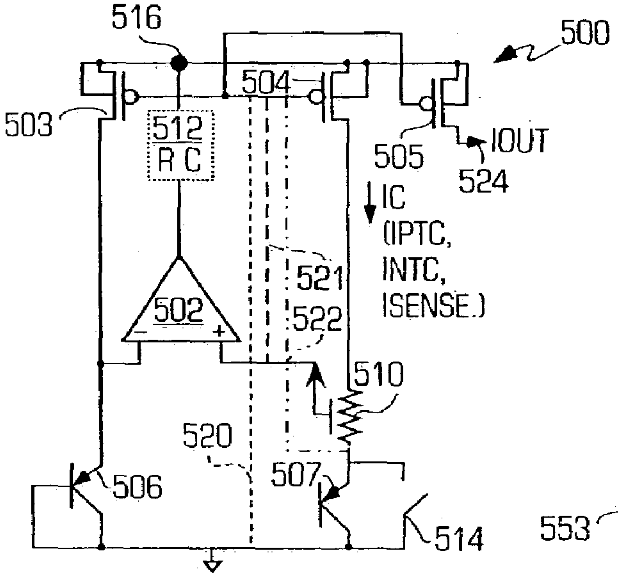
FIG. 5A is a schematic diagram of a bandgap reference generator of the high voltage shunt regulator of FIG. 2.

FIG. 5A is a schematic diagram of a band gap reference generator 500.

The band gap reference generator 500 comprises an operational amplifier 502, a plurality of PMOS transistors 503 through 505, a plurality of pnp bipolar junction transistors 506 and 507, a resistor 510, a filter 512, and a switch 514.

In alternative embodiments, the bandgap reference generator 500 comprises one of signal lines 520, 521, and 522.

The filter 512 is coupled between an output of the operational amplifier 502 and a voltage node 516. Another embodiment of the bandgap does not include the filter 512. The drain-source terminals of the PMOS transistor 503 and emitter-collector generator of the pnp bipolar junction transistor 506 is coupled in series between the voltage node 516 and ground. The drain-source terminals of the PMOS transistor 504, resistor 510, and the emitter-collector terminals of the pnp bipolar junction transistor 507 are coupled in series between the voltage node 516 and ground. The gates of the PMOS transistors 503, 504 and 505 are coupled together, and coupled to one of the signal lines 520, 521, or 522. In alternative embodiments, the gates of the PMOS transistors 503 and 504 may be coupled by the signal lines 520, 521, or 522 (shown as dashed lines) to ground, the positive input of the operational amplifier 502, and the emitter of the transistor 507, respectively. The drain-source terminals of the PMOS transistor 505 are coupled between the voltage node 516 and an output node 524, which provides an output current IOUT. The negative input of the operational amplifier 502 is coupled to the drain of the PMOS transistor 503 and the positive input of the operational amplifier is coupled to the no-error resistor divider output node of the resistor 510 (described in FIG. 6A). The switch 514 is coupled in parallel with the collector-emitter terminals of the pnp bipolar junction transistor 507.

The output node 524 provides an output current IOUT equal to a current IC that flows through the PMOS transistor 504, the resistor 510, and the bipolar junction transistor 507.

The current IC flowing in the right portion (through the resistor 510) of the band gap reference generator 500 equals either a positive temperature coefficient current IPTC or a negative temperature coefficient current INTC depending on the switch 514 being opened or closed, and a sense current ISENSE. A positive curve temperature coefficient current IPCTC or a negative curve temperature coefficient current INCTC is generated from a positive temperature coefficient current IPTC and a negative temperature coefficient current INTC as described below in conjunction with FIG. 19. A current summer (such as in FIG. 8) provides a final summation current $$ISUM=IPTC+INTC+(IPCTC \text{ and/or } INCTC) \quad (4)$$

The operation of the bandgap reference generator 500 is next described for the switch 514 being in open and closed states.

In a configuration in which the switch 514 is open, the positive temperature coefficient current IPTC is:

$$IPTC=dVBE/R_{510}=kT/q \ln a \quad (5);$$

where a=emitter ratio of $VBE_{507}$ to $VBE_{506}$; k=Boltzman constant, q=electron charge, and T=temperature in Kelvin.

In a configuration in which the switch 514 is closed, the negative temperature coefficient current INTC is $$INTC=VBE_{500}/R_{510} \quad (6).$$

A typical variation of VBE over temperature is −2 mV/° C. (Celsius).

The negative curve temperature coefficient current INCTC is an incremental current that is generated to adjust for a temperature coefficient and is defined as:

$$INCTC=IAPX0-INTC \quad (7)$$

where the negative temperature coefficient current INTC is defined by Equation (6) and the approximate zero temperature coefficient current IAPX0 is the summed output current (equation 9).

A positive curve temperature coefficient current IPCTC is generated to adjust the current and is defined as follows:

$$IPCTC=IPTC-IAPX0 \quad (8)$$

where the positive temperature coefficient current IPTC is defined by Equation (5).

The approximate zero temperature coefficient current IAPX0 is defined as the sum of the positive and negative temperature coefficient currents, IPTC and INTC, or may be expressed as:

$$LAPX0=IPTC+INTC \quad (9)$$

In alternate embodiments, the temperature coefficient currents IPTC and INTC are generated from other than PNP devices, such as MOS devices in sub-threshold operating regime or VT of MOS devices.

In another embodiment, the output of the filter 512 may be coupled to the gates of the PMOS transistors 503 and 504.

The zero temperature compensated voltage V0TC is generated from the summation of different current elements that have ratios that are trimmable, and that are applied across an output resistance. The zero temperature coefficient voltage V0TC is generated from the positive temperature coefficient current IPTC, the negative temperature coefficient current INTC, the positive curve temperature coefficient current IPCTC, and the negative curve temperature coefficient current INCTC. In another embodiment, this trimmable ratio of different current elements may be different at different V0TC levels.

The zero temperature coefficient current I0TC is generated from the summation of several currents that have an appropriate trimmable ratio. The currents are the positive temperature coefficient current IPTC, the negative temperature coefficient current INTC, the positive curve temperature coefficient current IPCTC, and the negative curve temperature coefficient current INCTC. In one embodiment, the trimmable ratio is generally different from the trimmable ratio of the zero temperature coefficient voltage.

The resistor 510 may be trimmable without creating additional error. In one embodiment, the resistor 510 is a trimmable resistor 600 described below in conjunction with FIG. 6A.

The resistor 510 may be controlled to have a variable impedance, for example, a low impedance, e.g., $R_{510}$ value is small, to help speed up settling time and/or reject power supply and coupling noise and a high impedance to have low power consumption such as during standby. The low impedance may be done at power up or during certain chip operations that generate a lot of on-chip noises such as memory programming or burst mode reading. This variable impedance provides a bandgap with variable impedance with precision voltage and current because the resistor trimming introduces insignificant error as described below in conjunction with FIG. 6A.

In an alternate embodiment, the resistor 510 is a fixed resistor and the positive input of the operational amplifier 502 may be coupled to one of the terminals of the resistor 510. It should be noted that alternate embodiments of FIGS. 5B, 7, 10, and 13 may similarly include a fixed resistor instead of a variable resistor, and a corresponding coupled of the operational amplifier to the resistor.

In an alternative embodiment, another filter, such as the filter 512 may be applied to the supply voltage VDD before being applied to the operational amplifier 502 and other circuit blocks (such as the current summer, and startup circuit described below).

In an alternative embodiment, the bandgap reference generator 500 is operated in a dynamic operation in which the switch 514 is opened and closed to sample the positive temperature coefficient current IPTC and the negative temperature coefficient current INTC, and the corresponding voltages and currents are stored in storage nodes (such as by capacitors (not shown).

Figure 6A:
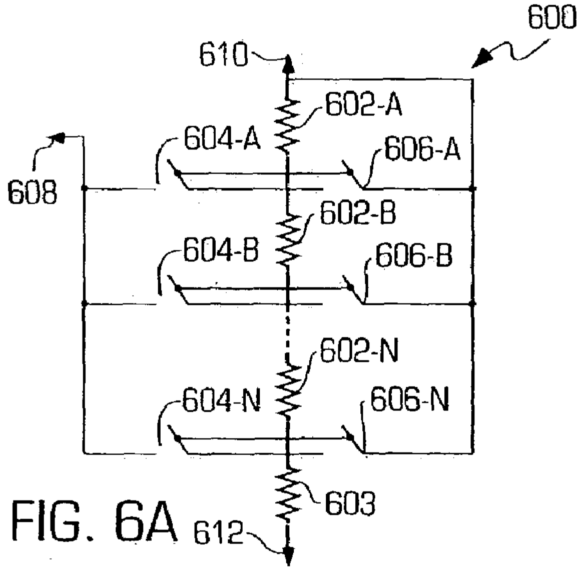
FIG. 6A is a block diagram illustrating a trimmable resistor of the bandgap reference generator of FIG. 5A.

FIG. 6A is a block diagram illustrating a trimmable resistor 600.

The trimmable resistor 600 comprises a plurality of resistors 602-A through 602-N, a resistor 603, a plurality of switches 604-A through 604-N, and a plurality of switches 606-A through 606-N.

The plurality of resistors 602-A through 602-N and the resistor 603 are coupled in series. The plurality of switches 604-A through 604-N are coupled from a node 608 to a respective resistor 602-A through 602-N, to selectively short the terminals of the respective resistor to the node 608. The plurality of switches 606-A through 606-N are coupled to a respective resistor 602-A through 602-N, to selectively short the terminals of the respective resistors. The resistor 602-A couples from a node 610 to the resistor 602-B. The resistor 603 is coupled between a node 612 to the resistor 602-N-1 (shown as 602-B in FIG. 6A). As shown in FIG. 5A, the node 608 is coupled to the positive input of the operational amplifier 502, the node 610 is coupled to the drain of the PMOS transistor 504 and the node 612 is coupled to the emitter of the bipolar transistor 507.

In this embodiment, the shorted resistor 606-A to 606-N may have a small voltage drop because of the VDS of the CMOS transistor, but this voltage drop only affects the VDS of the PMOS 504. However, the shorted resistor 604-A through 604-N does not introduce any voltage drop because no current flows through the shorted resistors (which connects to a gate of a MOS input device of the operational amplifier 502). The voltage at the positive terminal of the operational amplifier 502 then stays the same after trimming. Accordingly, the resistor trimming does not cause an error. In one embodiment, the switches 604 are CMOS transistors.

Figure 5B:
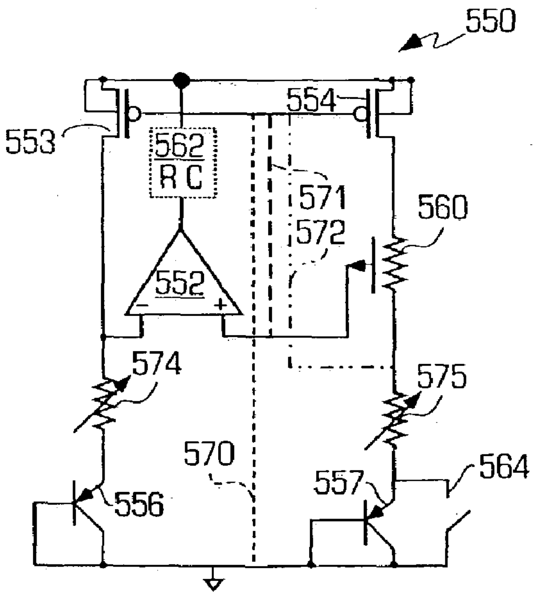
FIG. 5B is a schematic diagram of another bandgap reference generator of the high voltage shunt regulator of FIG. 2.

FIG. 5B is a schematic diagram illustrating a bandgap reference generator 550.

The bandgap reference generator 550 comprises an operational amplifier 552, a plurality of PMOS transistors 553 and 554, a plurality of pnp bipolar junction transistors 556 and 557, a plurality of resistors 560, 574, and 575, a filter 562, and a switch 564.

In alternate embodiments, the bandgap reference generator 550 comprises one of signal lines 570, 571, and 572. The bandgap reference generator 550 is similar to the bandgap reference generator 500 of FIG. 5A, with the addition of the variable resistors 574 and 575 coupled between the drains of the respective PMOS transistors 553 and 554 and the emitters of the pnp bipolar junction transistors 556 and 557. The variable resistors 574 and 575 may be the transistor 650 shown in FIG. 6B. The resistors 574 and 575 adjust the voltage levels coupled into the positive and negative terminals of the operational amplifier 552. The adjusted resistance of the variable resistor 574 is similar to that of the variable resistor 575 to provide similar voltage levels.

In another embodiment, the resistors 560 and 575 may be combined into a single resistor.

Figure 10:
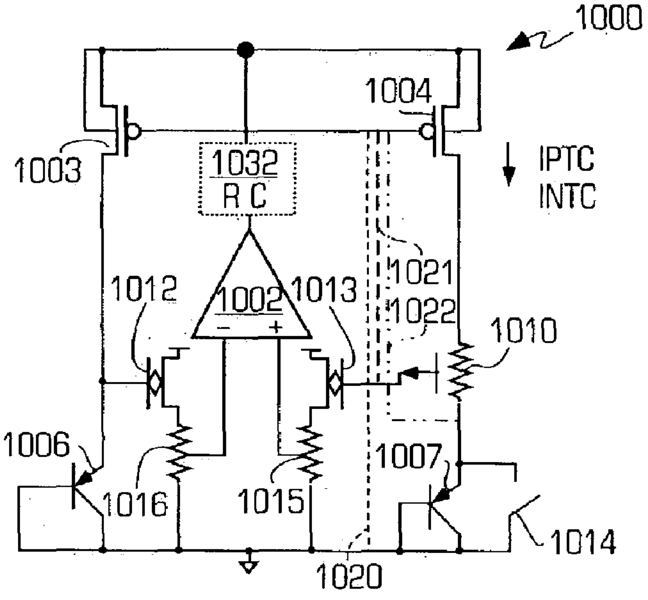
FIG. 10 is a schematic diagram illustrating a bandgap reference generator according to another embodiment.
Figure 11:
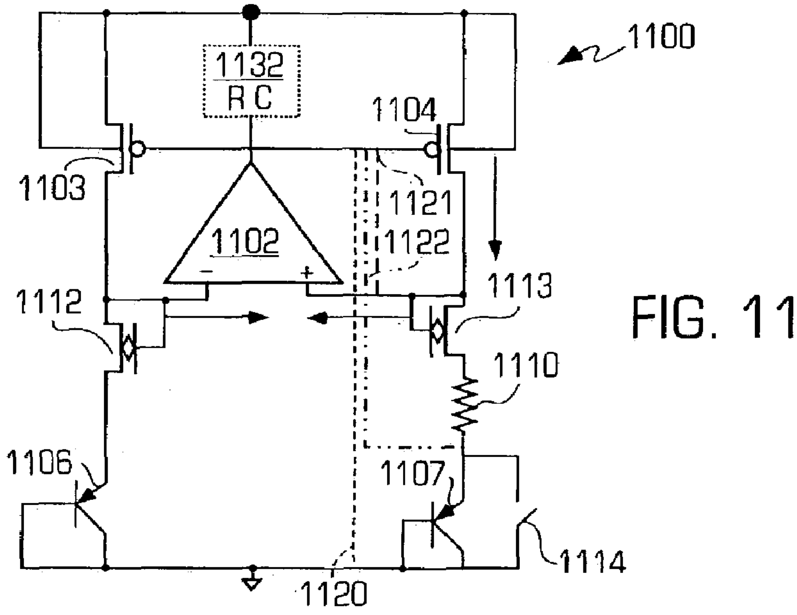
FIG. 11 is a schematic diagram illustrating a bandgap reference generator including a replica biased operational amplifier.

The use of variable resistors 574 and 575 may be included in the bandgap generators 700 (FIG. 7), 1000 (FIG. 10), and 1100 (FIG. 11).

Figure 6B:
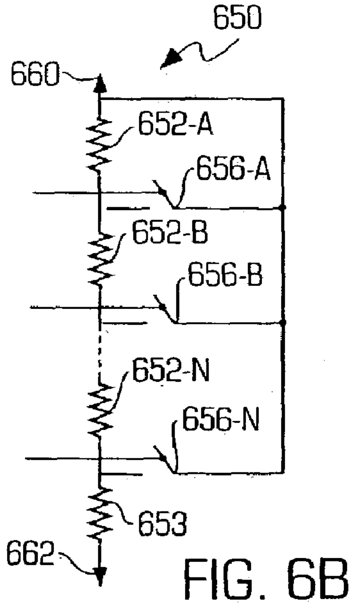
FIG. 6B is a block diagram illustrating a trimmable resistor of the bandgap reference generator of FIG. 5B.

FIG. 6B is a schematic diagram illustrating a trimmable resistor 650.

The trimmable resistor 650 comprises a plurality of resistors 652-A through 652-N, a resistor 653, and a plurality of switches 656-A through 656-N. By selectively closing the switches 656-A through 656-N, corresponding resistors 652 are shorted out to alter the resistance between the nodes 660 and 662.

Figure 7:
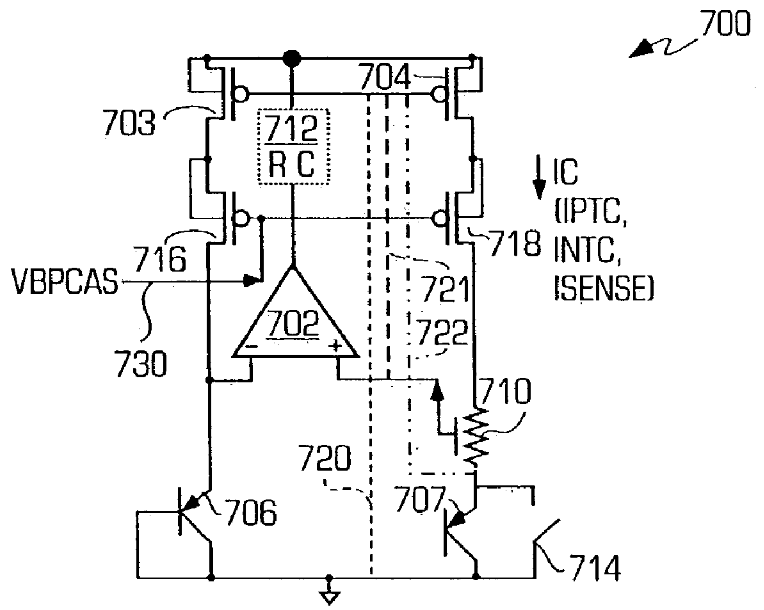
FIG. 7 is a schematic diagram illustrating a bandgap reference generator having cascoding in an alternate embodiment.

FIG. 7 is a schematic diagram illustrating a band gap reference generator 700 having cascoding.

The cascoding described for FIG. 7 also is applicable to the bandgap generators described in conjunction with FIGS. 5B, 10 and 11.

The band gap reference generator 700 comprises an operational amplifier 702, a plurality of PMOS transistors 703, 704, 716, and 718, a plurality of pnp bipolar junction transistors 706 and 707, a resistor 710 and a switch 714.

The bandgap reference generator 700 is arranged in a manner similar to the bandgap reference generator 500 (see FIG. 5) except a cascode PMOS transistor 716 is coupled between the PMOS transistor 703 and the transistor 706, and a cascode PMOS transistor 718 is coupled between the PMOS transistor 704 and the resistor 710. The gates of the cascode PMOS transistor 716 and 718 are coupled to a cascode bias voltage (VBPCAS) 730.

FIG. 8 is a schematic diagram illustrating a current summer 800.

The current summer 800 may be coupled to the output of a plurality of band gap reference generators to add the currents from the band gap reference generators. The current summer 800 comprises a plurality of PMOS transistors 802 through 805, a plurality of NZ NMOS transistors 806 and 807, a plurality of NN NMOS transistors 808 and 809, and a power down circuit 810. The power down circuit 810 comprises a PMOS transistor 812 and a plurality of NMOS transistors 813 and 814. The transistors 802 and 803 represents one input current and the transistors 804 and 805 represent another input current. Multiple input currents are represented by duplicating the transistors 802 and 803 and connecting them in parallel with the transistors 802 and 803 with different input signals INN.

The PMOS transistors 803 and 805 are biased by a cascode voltage VBPCAS.

The NZ transistor 807 and the NN transistor 809 are self-cascoding. The NZ transistor 806 and the NN transistor 808 are self-cascoding through the power down circuit 810 in response to the power down circuit 810 being enabled, and are coupled to ground when the power down signal is enabled. The power down circuit 810 disables or enables the self-cascoding of the NZ transistor 806 and the NN transistor 808, and grounds the gates of the NZ transistor 806 and the NN transistor 808 during power down. The source of the PMOS transistor 812 is coupled to its own well.

The current I in the NZ NMOS transistor 806 and the NN NMOS transistor 808 is the summation of the currents in the circuit of PMOS transistors 802 and 803 and the circuit of PMOS transistors 804 and 805. The output current IOUTN in the NMOS transistors 807 and 809 mirrors the summed current I in the NMOS transistors 806 and 808 by any desirable mirror ratio by adjusting the size ratio of the transistors 807 and 809 to that of the transistors 806 and 808.

FIG. 9 is a schematic diagram illustrating a current to voltage converter 900.

The current to voltage converter 900 comprises a plurality of PMOS transistors 902 and 903, and a resistor 904. The transistor 902 and 903 represents a current sink into the resistor 904.

The current to voltage converter 900 may be coupled to the output of the current summer 800 to convert the summed currents from the band gap reference generators into a voltage. The coupling is done for example by two PMOS transistors 902A and 903A (not shown) connected in series from power supply VDD (used interchangeably as VSUP) to a node coupled to a node IOUTN of FIG. 8 and to a node IN of FIG. 9. The gate of the transistor 902A is coupled to the drain of the transistor 903A. The gate of the transistor 903A is connected to the bias voltage VBPCAS.

The resistor 904 may be trimmable in a similar manner as the trimmable resistor 600 described above and thus does not introduce voltage errors. In one embodiment, the resistor 904 is the trimmable resistor 600.

The current to voltage converter 900 may generate the zero temperature coefficient voltage (V0TC) 116 by applying the appropriate trimmable summed current from current summer 800 into the resistor 904.

FIG. 10 is a schematic diagram illustrating a band gap reference generator 1000.

The band gap reference generator 1000 is similar to the band gap reference generator 500, and also comprises voltage level shift for the control loop.

The band gap reference generator 1000 comprises an operational amplifier 1002, a plurality of PMOS transistors 1003 and 1004, a plurality of pnp bipolar junction transistors 1006 and 1007, a plurality of resistors 1010, 1015, and 1016, a filter 1032, a switch 1014, and a plurality of NZ NMOS transistors 1012 and 1013. In another embodiment, the bandgap does not include the filter 1032. In another embodiment, the filter 1032 is coupled to the gates of the PMOS transistors 1003 and 1004. The switch 1014 functions similarly to the switch 514 (FIG. 5A).

The NMOS transistor 1012 and 1013 and the resistors 1016 and 1015 provide an appropriate low voltage level shift for the control loop. The resistors 1016 and 1015 may be coupled from drains of the transistors 1012 and 1013, respectively, to a high voltage supply instead of coupled from the sources of the transistors 1012 and 1013, respectively, to ground and the sources of the transistors 1012 and 1013 are coupled to ground. In this case, the transistors 1012 and 1013 and the resistors 1016 and 1015 constitute common source gain stages, and the loop stability is designed appropriately.

In another embodiment, the NMOS transistors 1012 and 1013 each are replaced by a PMOS transistor including drain-source terminals coupled to a high voltage supply and the respective resistor 1016 and 1015 to provide an appropriate high voltage level for control loop. Common source gain stages mix alternately as described above for the transistors 1012 and 1013 and resistors 1016 and 1015.

In another embodiment, an NMOS transistor is coupled in series to each of the resistors 1016 and 1015 to ground and includes its gate biased by a current bias to provide a current bias to the transistor 1012 and 1013 and resistor 1016 and 1015 control loop. In one embodiment, the current bias can be derived from the temperature coefficient currents (IPTC, INTC) generated from the bandgap.

FIG. 11 is a schematic diagram illustrating a band gap reference generator 1100 including a replica biased operational amplifier.

The band gap reference generator 1100 comprises an operational amplifier 1102, a plurality of PMOS transistors 1103 and 1104, a plurality of pnp bipolar junction transistors 1106 and 1107, a resistor 1110, a filter 1132, a switch 1114, and a plurality of NZ NMOS native transistors 1112 and 1113.

A PMOS transistor 1103, the NMOS transistor 1112 and the bipolar junction transistor 1106 are coupled together in series to form a first leg of the bandgap reference general 1100. The PMOS transistor 1104, the NMOS transistor 1113, the resistor 1110, and the bipolar junction transistor 1107 are coupled in series to form a second leg. The negative and positive inputs of the operational amplifier 1102 are connected to the drain of the diode connected NMOS transistors 1112 and 1113, respectively. The filter 1132 is coupled between the output of the operational amplifier 1102 and a common node formed by the sources of the PMOS transistors 1103 and 1104. The filter 1132 is optional. Alternatively, the output of the operational amplifier 1102 is coupled to a common node formed by the gates of the PMOS transistors 1103 and 1104 with the sources of the PMOS transistors 1103 and 1104 coupled to a high voltage supply, such as VDD. The switch 1114 functions similarly to the switch 514 (FIG. 5A).

The operational amplifier 1102 has a similar bias configuration as the bandgap core so that the bias is a replica of the bandgap core.

Figure 12:
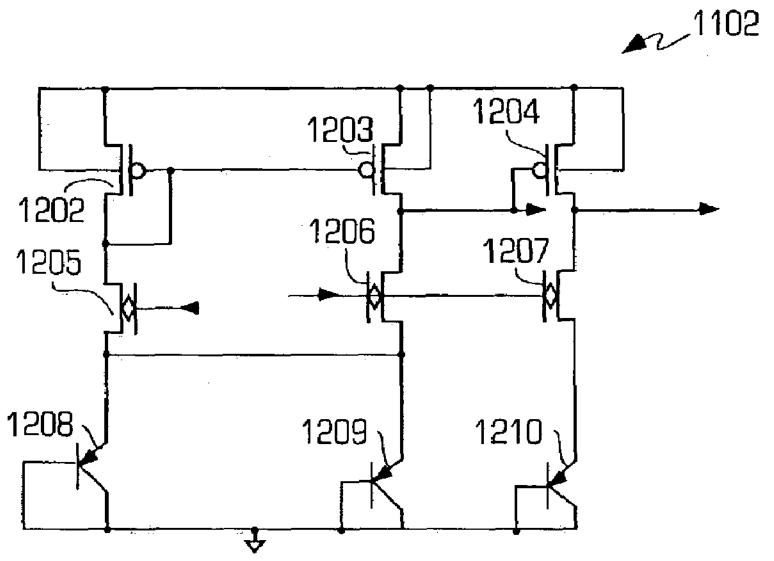
FIG. 12 is a schematic diagram illustrating a replica biased operational amplifier of the bandgap reference generator of FIG. 11.

FIG. 12 is a schematic diagram illustrating the replica biased operational amplifier 1102.

The replica biased operational amplifier 1102 comprises a plurality of PMOS transistors 1202 through 1204, a plurality of NMOS transistors 1205 through 1207 and a plurality of pnp bipolar junction transistors 1208 through 1210. The transistors 1202, 1203, 1205, 1206, 1208, and 1209 are arranged as a differential amplifier with the NMOS transistors 1205 and 1206 as the input pair. The transistors 1204, 1207, 1210 are arranged as an output stage to mirror the current from the differential amplifier portion of the operational amplifier 1102. The circuit leg formed of the transistors 1202, 1205 and 1208 form a replica of the transistors 1103, 1112, 1106 of the bandgap reference generator 1100 as shown in FIG. 11. The circuit leg formed of the transistors 1203, 1206 and 1209 forms a replica of the transistors 1104, 1113, 1107, and the resistor 1110 of the bandgap reference generator 1100 as shown in FIG. 11. Alternatively, the NMOS native transistors 1112, 1113, 1205, 1206, and 1207 may be enhancement NMOS transistors.

Figure 13:
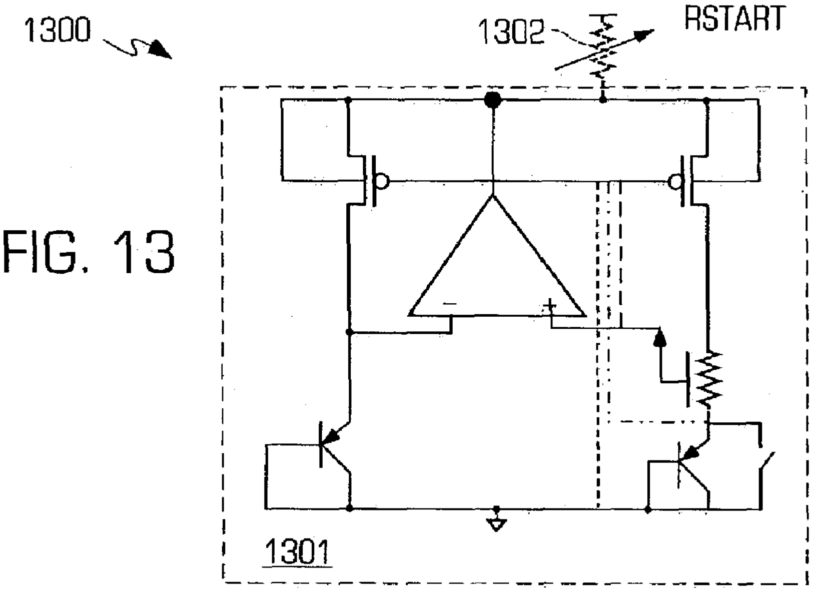
FIG. 13 is a schematic diagram illustrating a bandgap reference generator including a startup circuit.

FIG. 13 is a schematic diagram illustrating a bandgap reference generator 1300 including a startup circuit.

The bandgap reference generator 1300 comprises a bandgap reference generator 1301 and a resistor 1302. The bandgap reference generator 1301 is similar to the bandgap reference generator 500, but without the output PMOS transistor 505. The resistor 1302 is coupled between the voltage node on the output of the operational amplifier and may supply current at startup until the operational amplifier is sufficiently operational to take over operation of the bandgap reference generator 1301.

Figure 14:
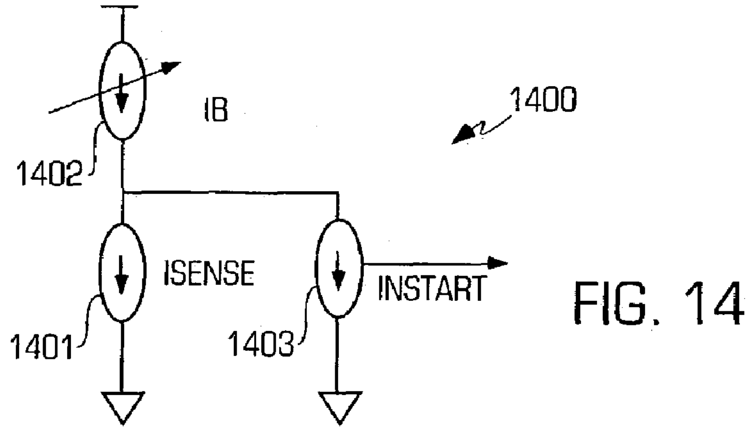
FIG. 14 is a schematic diagram illustrating a startup circuit.

FIG. 14 is a schematic diagram illustrating a startup circuit.

The startup circuit 1400 comprises a sense current generator 1401, a bias current generator 1402, and a start current 1403. The sense current generator 1401 and the start current generator 1403 are coupled to each other in parallel and coupled to the bias current generator 1402. In one embodiment, a sense current from the sense current generator 1401 is mirrored out from a positive temperature coefficient current IPTC or a negative temperature coefficient current INTC to a bandgap reference generator such as described above. As the supply voltage VCC increases, the bias current from the bias current generator 1402 is reduced. In one embodiment, a bias current generator is a plurality of PMOS transistors coupled in series from VDD to the sense current 1401 with its gate coupled to ground. The start current 1403 is mirrored to be applied to an NMOS device and the bandgap reference generator.

The starting up of the bandgap operates as follows. If the bandgap is not started up by itself, its bias current (IPTC or INTC) is zero, the start current 1403 is then the same as bias current 1402, which is then injected into the bandgap to make its bias currents non-zero. Once the bandgap is started up, the sense current 1401, which is mirrored from the bandgap, then begins to conduct. Once the sense current reaches its designed value, its value is greater than the bias current 1402, the start current 1403 is then approximately zero. At this point the start current 1403 does not affect the bandgap bias current. In another embodiment, as the supply voltage VDD increases, the bias current from the bias current generator 1402 is reduced. This may be implemented as follows: as the supply voltage VDD increases, a comparator detects if VDD is more than a reference voltage (for example 2 V derived from the bandgap) and the output of the comparator is then used to reduce the bias current 1402, for example, by turning on some additional PMOS transistors in series to realize the bias current 1401 as described above.

In an alternate embodiment, the start current generator 1403 may be replaced by a start current generator that is coupled between the supply voltage in parallel with the bias current generator, to provide a start current that is applied to a PMOS transistor and to the bandgap reference generator. An example is the transistor 1506 and 1507 portion of a startup circuit 1500 (see FIG. 15).

Figure 15:
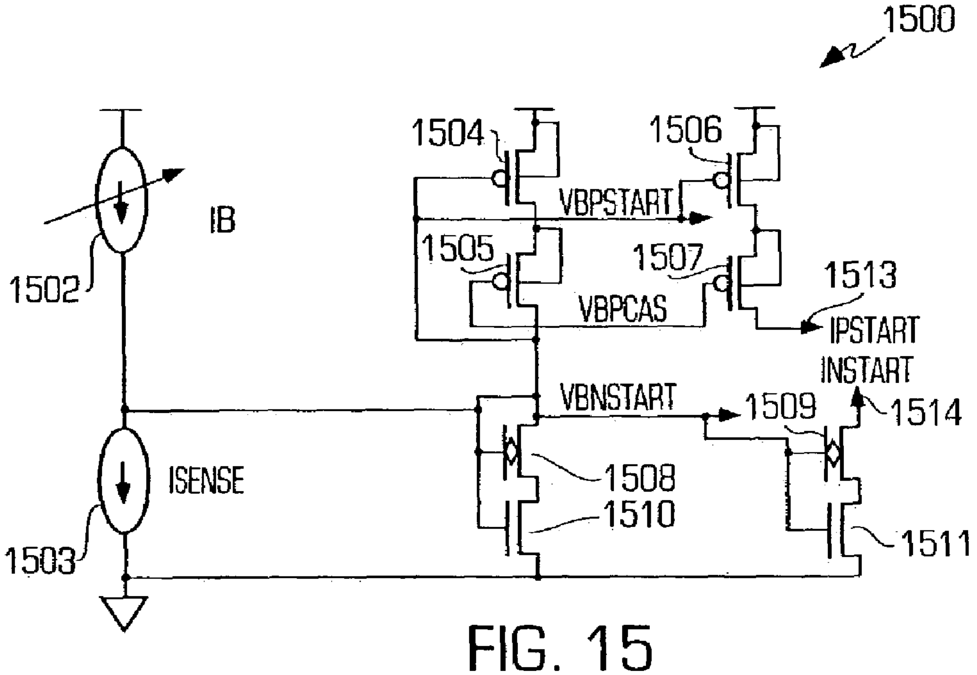
FIG. 15 is a schematic diagram illustrating a startup circuit.

FIG. 15 is a schematic diagram illustrating a startup circuit 1500. The startup circuit 1500 comprises a bias current generator 1502, sense current generator 1503, a plurality of PMOS transistors 1504 through 1507, a plurality of NZ NMOS transistors 1508 and 1509, and a plurality of NMOS transistors 1510 and 1511. The PMOS transistors 1506 and 1507 are arranged as a cascode to provide a startup current IPSTART on a node 1513. The NMOS transistors 1509 and 1511 are arranged as a cascode to provide a startup current INSTART on a node 1514. The series connected bias current generator 1502 and sense current generator 1503 provide a bias start voltage to the bias and stage formed of the transistors 1504, 1505, 1508, and 1510. The bias current 1502 and the sense current 1503 are similar to the bias current 1402 and the sense current 1403, respectively. The start current 1514 is similar to the start current 1403.

Figure 16:
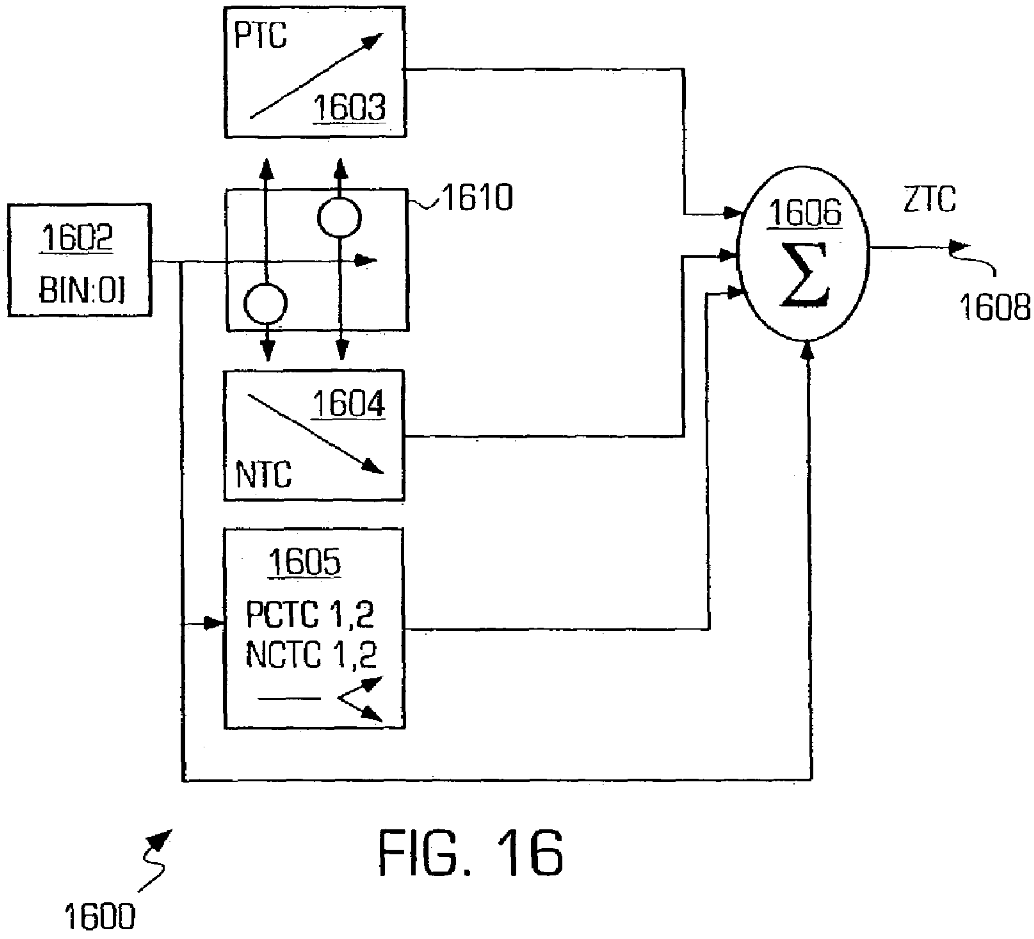
FIG. 16 is a block diagram illustrating a binary complementary trimming circuit.

FIG. 16 is a block diagram illustrating a binary complementary trimming circuit 1600.

The binary complementary trimming circuit 1600 comprises a bit signal generator 1602, a positive temperature coefficient current generator 1603, a negative temperature coefficient generator 1604, a trimmable curve temperature coefficient curve current generator 1605, and a current summer 1606.

The current summer 1606 sums the currents from the positive temperature coefficient current generator 1603, the negative temperature coefficient generator 1604, and the trimmable curve temperature coefficient current generator 1605 to generate a zero temperature compensated current ZTC 1608. The bit signal generator 1602 generates the control bits in response to control signals from the fuse circuit 110. The bit signal generator 1602 provides the control bits to the generator 1602, 1603, 1604, and 1605. The binary complementary trimming circuit 1600 further comprises an inverting circuit 1610 that provides inverted control signals to the positive temperature coefficient current generator 1603 and negative temperature coefficient generator 1604 to provide complementary trimming. In one embodiment, each incremental trim of the positive temperature coefficient current generator 1603 corresponds to a complementary (or decremental) trimming of the negative temperature coefficient current from the negative temperature coefficient generator 1604. In an illustrative example, if the positive temperature coefficient current is trimmed upward by one or a plurality of increments, the negative temperature coefficient current is automatically trimmed down by one or a plurality of decrements. Vice versa, if the positive temperature coefficient current is trimmed downward by one or a plurality of decrement; the negative temperature coefficient current is automatically trimmed up by one or a plurality of increments. The trimmable current temperature compensated current generator 1605 generates a trimmable positive temperature coefficient current PCTC1 and a negative temperature coefficient current NCTC1. The currents PCTC1 and NCTC1 are zero at a temperature less than a desired temperature. The currents PCTC2 and NCTC2 are similar to PCTC1 and NCTC1 except they are zero at a different temperature.

Figure 17:
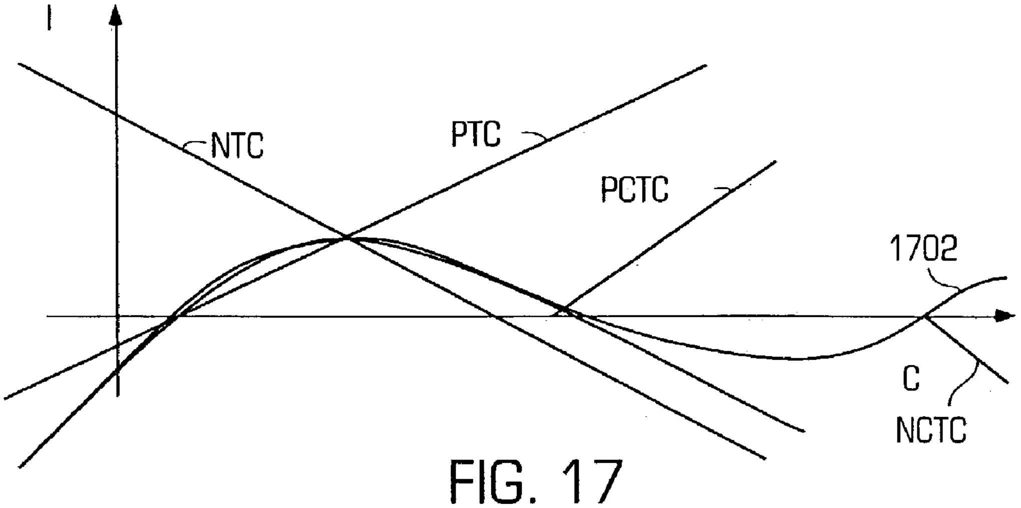
FIG. 17 is a graph illustrating the temperature coefficient current using binary complementary temperature coefficient trimming.

FIG. 17 is a graph illustrating the complementary temperature coefficient current using binary complementary temperature coefficient trimming.

A line 1702 corresponds to the temperature coefficient current generated by the binary complementary trimming circuit 1600 as the sum of the various temperature compensated currents. By altering the individual current characteristics and the adjustable trimming, the temperature compensated current shown in the line 1702 may be varied to have a desired characteristic, such as a flatter curve over a desired temperature range, for example from 0° C. to 70° C. or from −40° C. to 125° C.

Figure 18:
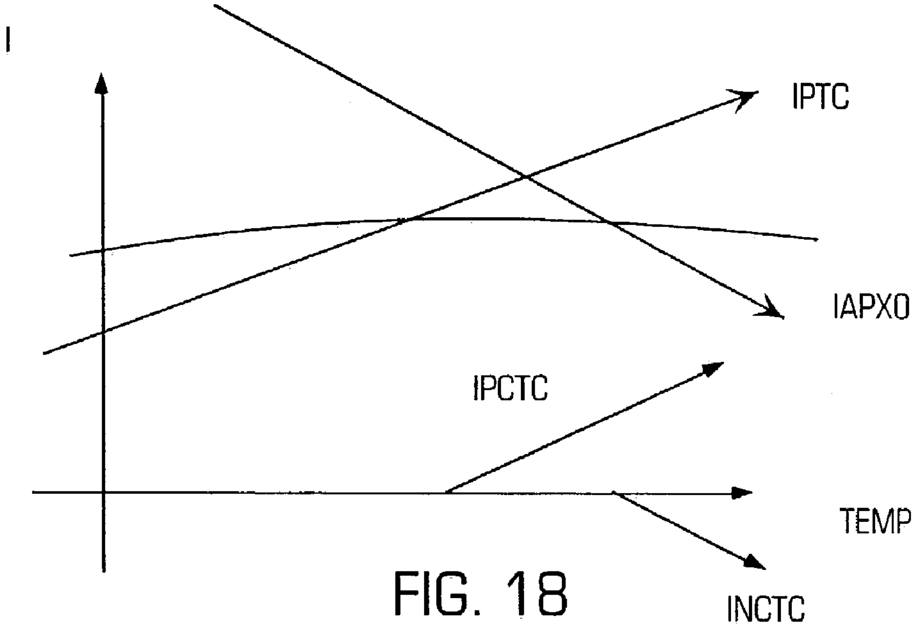
FIG. 18 is a graph illustrating the generation of a complementary temperature coefficient current.

FIG. 18 is a graph illustrating the generation of a complementary temperature coefficient current.

The approximate zero temperature coefficient current IAPX0 is derived from equations (8) and (9), described above.

Figure 19:
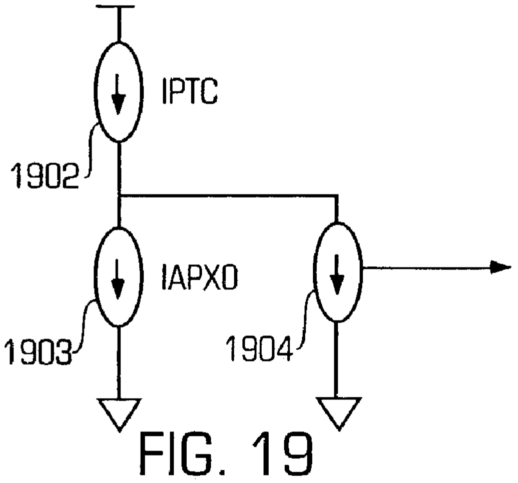
FIG. 19 is a block diagram illustrating a complementary temperature coefficient current generator.

FIG. 19 is a block diagram illustrating a curved temperature coefficient current generator 1900.

The curve temperature coefficient current generator 1900 comprises a positive temperature coefficient current generator 1902, a IAPX0 current generator 1903, and a curve temperature coefficient current generator 1904.

The curve temperature coefficient current generator 1900 generates the positive curved temperature coefficient current IPCTC defined above in Equation (8). Similarly, the negative curved temperature coefficient current INCTC is generated.

Figure 20:
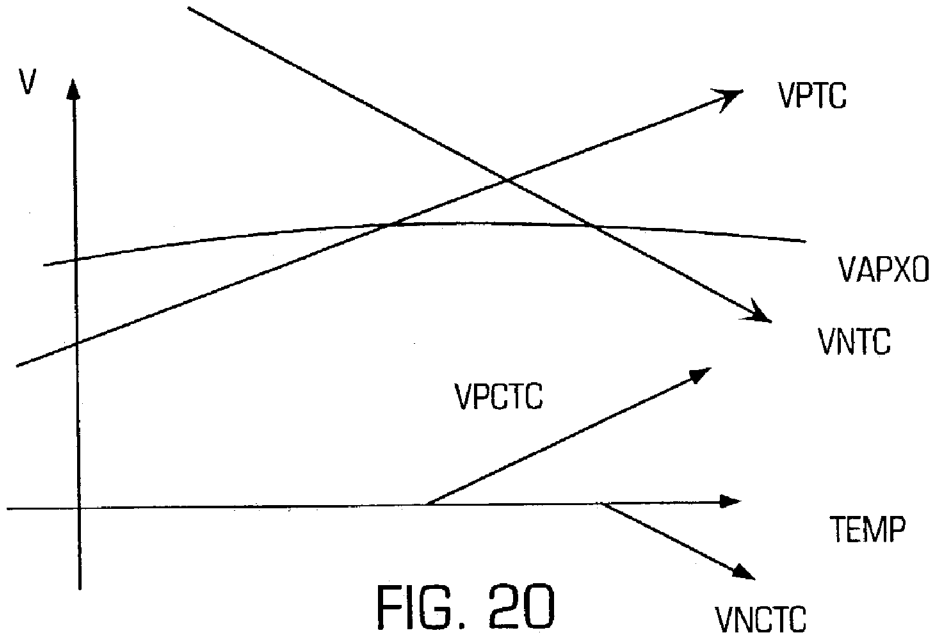
FIG. 20 is a graph illustrating the generation of a complementary temperature coefficient voltage.

FIG. 20 is a graph illustrating the generation of a complementary positive curve temperature coefficient voltage VPCTC.

In an alternate embodiment to the generation of a complementary temperature coefficient current of FIG. 18, a curved voltage element may be used instead of a curved current element. In one embodiment, the positive temperature coefficient voltage is generated by applying the positive temperature coefficient current to a resistor. In this embodiment, the approximate zero temperature coefficient voltage VAPX0 equals the positive temperature coefficient voltage VPTC plus the negative temperature coefficient voltage VNTC.

Figure 21:
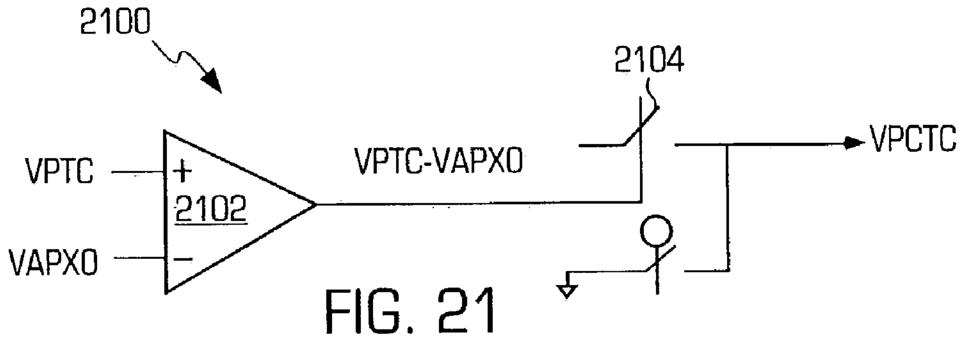
FIG. 21 is a schematic diagram of a complementary positive temperature coefficient voltage generator.

FIG. 21 is a schematic diagram of a complementary positive temperature coefficient voltage generator 2100.

The complementary positive temperature coefficient voltage generator 2100 comprises a comparator 2102 and a plurality of switches 2104 and 2106. The comparator 2102 compares the positive temperature coefficient voltage VPTC to the approximate zero temperature coefficient voltage VAPX0. The comparison result is used to generate a difference VPTC minus VAPX0 voltage that is sampled by the switch 2104 to generate the complementary positive curve temperature coefficient voltage VPCTC. If the positive temperature coefficient voltage VPTC is greater than the approximate zero temperature coefficient voltage VAPX0 (VPTC>VAPX0), the switch 2104 is closed to provide an output voltage VPTC minus VAPX0 as the complementary positive curve temperature coefficient voltage VPCTC. If the positive temperature coefficient voltage VPTC is smaller than the approximate zero temperature coefficient voltage VAPX0 (VPTC<VAPX0), the switch 2106 is closed to provide a ground GND as the complementary positive curve temperature coefficient voltage VPCTC. Similarly, a complementary negative curve temperature coefficient voltage VNCTC may be generated.

In an alternative embodiment, if the positive temperature coefficient voltage VPCT is greater than the approximate zero temperature coefficient voltage VAPX0 (VPTC>VAPX0), the positive temperature coefficient voltage VPTC is provided by the switch from the positive input of the comparator 2102 as the complementary positive curve temperature coefficient voltage VPCTC. In this embodiment, the voltage VPCTC has a higher voltage level.

Figure 22:
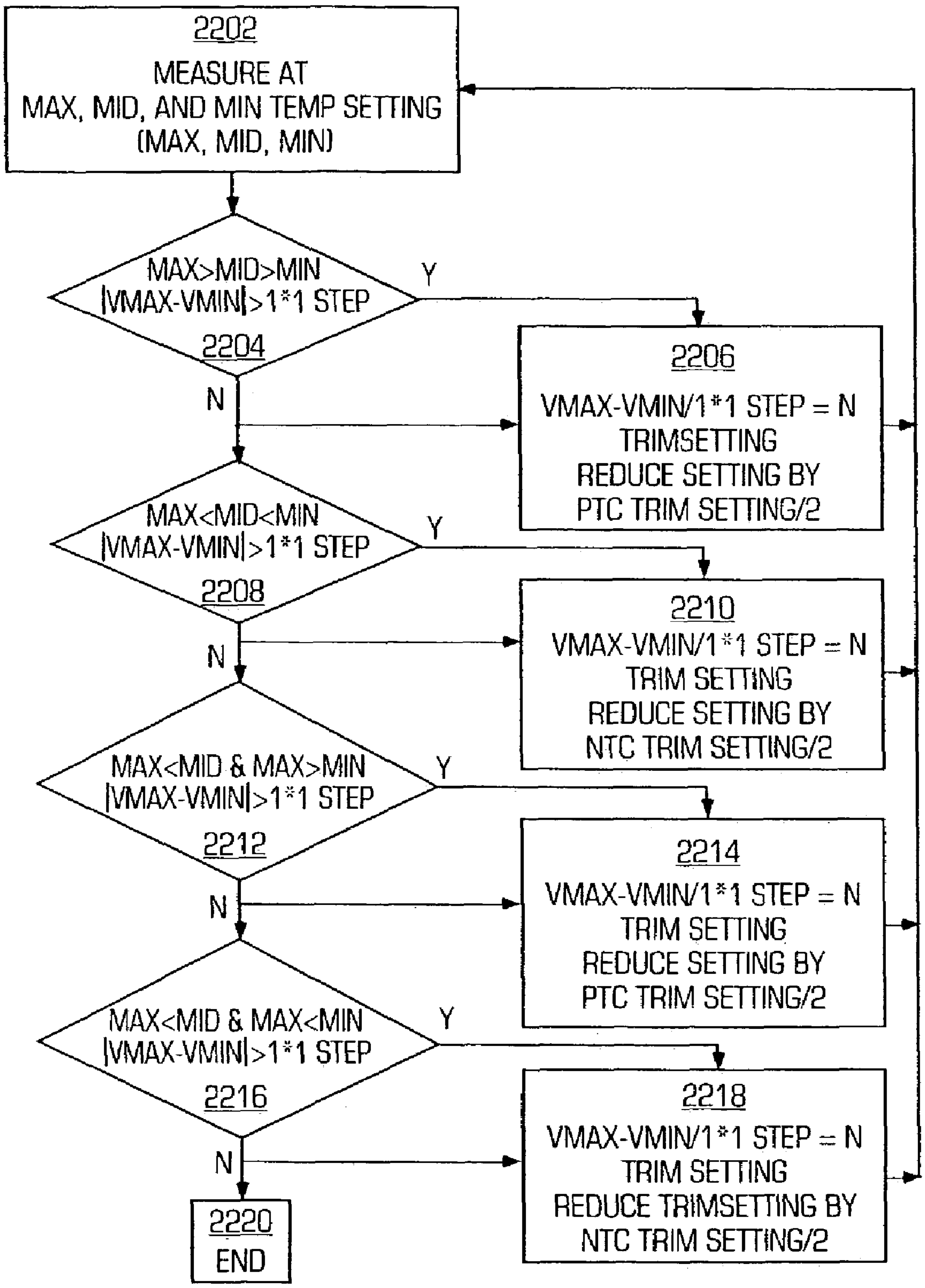
FIG. 22 is a flowchart illustrating an operation of approximation complementary trimming.

FIG. 22 is a flow chart illustrating an operation of approximation complementary trimming.

The procedure of approximation complementary trimming measures the voltages (or currents) at maximum, middle, and minimum temperature settings and based on the comparisons adjusts the TC trimming until the resulting maximum, middle and minimum voltages are in a desired range. For example, here a trim step (1*IV step) is assumed. The TC trimming is adjusted in the positive TC (PTC) direction by trimming downward the PTC trim setting. In the process, the negative TC (NTC) trim setting is automatically adjusted upward as described previously. Similarly, the TC trimming is adjusted in the negative TC (NTC) direction by trimming downward the NTC trim setting. In the process, the PTC is automatically adjusted upward.

The voltage is measured at maximum (max), a middle (mid) and minimum (min) temperature (temp) trim setting (block 2202). The measured voltages are compared to determine whether the voltage at the maximum temperature setting is greater than the voltage at the middle temperature setting which is greater than the voltage at the minimum temperature setting and whether the absolute value of the difference between the voltages of the maximum and minimum voltage values is greater than one incremental voltage (IV) step (block 2204). In the event that these comparisons are met, the TC trimming is adjusted so that the voltage difference is divided by the incremental voltage step equals the number N for the TC trim setting and the trim settings are reduced in the positive TC direction by the number N trim setting divided by two (block 2206) and the voltage measurement is repeated (block 2202).

On the other hand, if the comparison is not met (block 2204) and another comparison is performed as to whether or not the voltage at the maximum temperature setting is less than the voltage at the middle temperature setting and whether the voltage at the middle temperature setting is less than the voltage at the minimum temperature setting and that the absolute value of the difference between the voltages of the maximum voltage value and the minimum voltage value is greater than one incremental voltage step (block 2208). If the comparison is true, the voltage difference is divided by the incremental voltage step to determine the number N trim setting, and the trim setting is reduced in the negative TC direction by half of the number N (block 2210), the procedure returns to measuring the voltages (block 2202).

On the other hand, if the comparison is not true (block 2208), a new comparison is performed (block 2212). If the voltage of the maximum temperature setting is less than the voltage at the middle of the temperature setting and the voltage at the maximum temperature setting is greater than the voltage at the minimum temperature setting, and the absolute value of the difference between the voltages of the maximum voltage value and minimum voltage value is greater than one incremental voltage step, the TC trim setting is adjusted (block 2214). The voltage difference is divided by the incremental voltage step to set a number N of trim settings, and the trim setting is reduced in the positive TC direction by half the number N(N/2) (block 2214). The procedure then returns to measuring voltages (block 2202).

On the other hand if the comparison is not true (block 2212), another comparison is performed (block 2216). If the voltage at the maximum temperature setting is less than the voltage at the middle temperature setting and the voltage at the maximum temperature setting is less than the voltage at the minimum temperature setting, and the absolute value of the difference between the voltages of the maximum voltage value and minimum voltage value is greater than an incremental voltage step, another TC trim adjustment is performed (block 2218). The voltage difference is divided by the incremental voltage step to set a number N trim settings and the TC trim setting is reduced in the negative TC direction by the number N divided 2 (N/2) (block 2218). The voltages are again measured (block 2202).

On the other hand, if the comparison is not true, the procedure ends (block 2720). In this case, the difference between the voltage at the maximum and middle and minimum temperature settings is less than an incremental voltage step.

Figure 23:
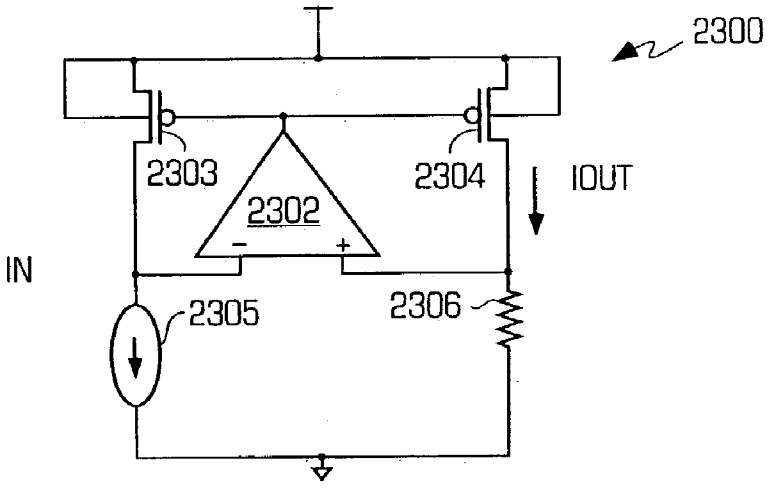
FIG. 23 is a schematic diagram illustrating a low voltage current mirror bandgap reference.

FIG. 23 is a schematic diagram illustrating a low voltage current mirror 2300 that is used in the bandgap reference generator for coupling the current.

The low voltage current mirror 2300 comprises a plurality of PMOS transistors 2303 and 2304, an amplifier 2302, a current source 2305, and a resistor 2306. The resistor 2306 represents a load for the transistor 2304. The load can be a resistor, a MOS or a capacitor. The PMOS transistor 2303 and the current source 2305 form a first leg of the circuit 2300. The PMOS transistor 2304, and the resistor 2306 form a second leg of the circuit 2300 with the second leg mirroring the current from the first leg. In this embodiment, the minimum VDD is only approximately two times the VDS at saturation of the PMOS transistors 2303 or 2304. Each $VDS_{SAT}$ is used to sustain a current across a MOS transistor. The amplifier 2302 forces the VDS of the PMOS transistors 2303 and 2304 to be equal. Another embodiment has the positive terminal of the amplifier 2302 coupled to a bias voltage.

Figure 24:
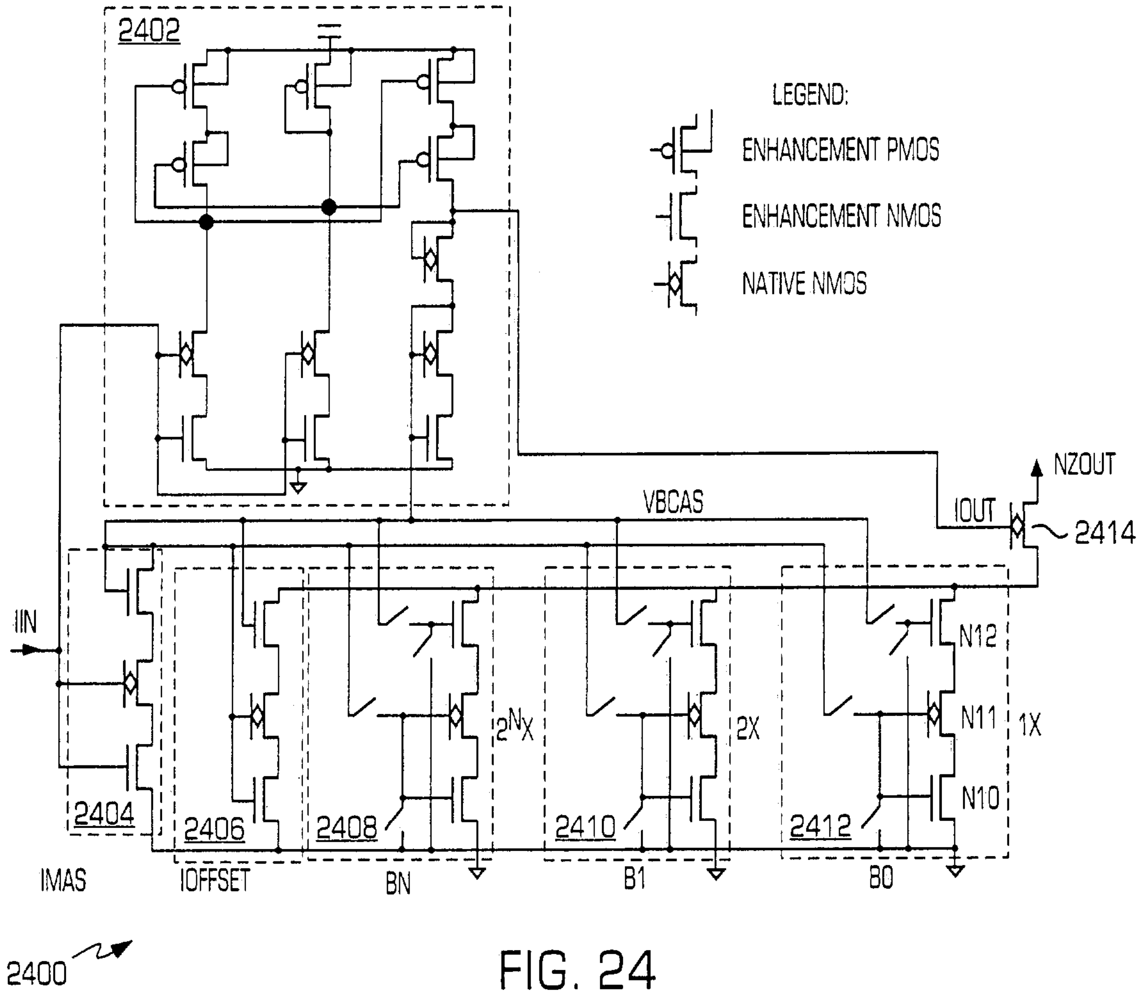
FIG. 24 is a schematic diagram illustrating a current trim circuit.

FIG. 24 is a schematic diagram illustrating a current trim circuit 2400 that is used to trim the current for the bandgap reference generator and is used to set the level for the high voltage regulator.

The current trim circuit 2400 comprises a bias circuit 2402, a first cascode circuit 2404, a second cascode circuit 2406, a third cascode circuit 2408, a fourth cascode circuit 2410, a fifth cascode circuit 2412, and a native NMOS transistor 2414. The cascode circuits 2404, 2406, 2408, 2410, 2412 each comprise three NMOS transistors, the middle of the three being a native NMOS transistor, and the other two being enhancement NMOS transistors. The cascode circuits 2404, 2406, 2408, 2410 and 2412 together with 2414 are self-bias triple cascoding including one bias leg for an input bias current IIN.

In another embodiment, the native NMOS transistor 2414 is omitted.

The self-cascoding bias circuit 2402 provides biases for the self-bias triple cascoding circuits 2404, 2406, 2408, 2410, 2412 and 2414. The cascode circuits 2408 and 2410 include switches for selectively disabling or enabling the circuits to selectively trim the output current IOUT.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A charge pump high voltage shunt regulator comprising:

a high voltage terminal coupled to a charge pump circuit; and an operational amplifier having a first input coupled to the high voltage terminal, having a power supply terminal coupled to the high voltage terminal, having a second input coupled to receive a reference voltage, and having an open drain output coupled to the high voltage terminal for regulating the voltage on said high voltage terminal.

2. The high voltage regulator of claim 1 wherein the operational amplifier comprises a combination of low voltage devices and high voltage devices.

3. The high voltage regulator of claim 1 wherein the operational amplifier comprises high voltage devices.

4. The high voltage regulator of claim 1, further comprising:

a filter network coupled between the first input of the operational amplifier and the high voltage terminal and coupled between the power supply terminal and the high voltage terminal.

5. The high voltage regulator of claim 4 wherein the filter is an RC network.

6. The high voltage regulator of claim 4 wherein the filter is coupled to a very high voltage supply.

7. The high voltage regulator of claim 4 wherein the operational amplifier comprises a combination of low voltage devices and high voltage devices.

8. The high voltage regulator of claim 4 wherein the operational amplifier comprises high voltage devices.

* * * * *